Nov. 12, 1935.  G. L. COLBIE  2,021,113
WIREBOUND BOX
Original Filed April 23, 1932
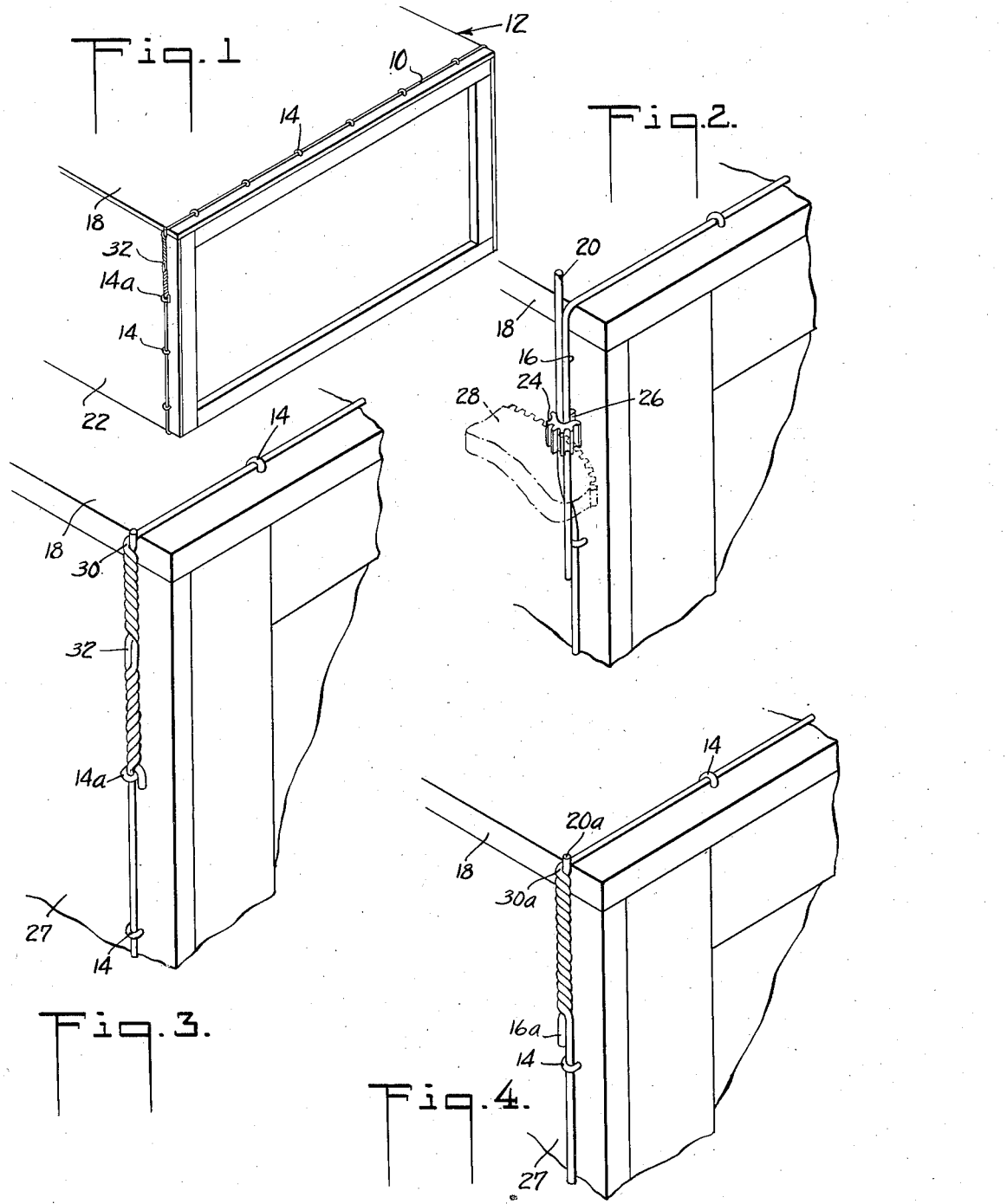
INVENTOR
Gus L. Colbie
ATTORNEY Patented Nov. 12, 1935

2,021,113

UNITED STATES PATENT OFFICE 2,021,113

WIREBOUND BOX

Gus L. Colbie, Brooklyn, N. Y., assignor to F. MacGovern Corporation, New York, N. Y., a corporation of New York Original application April 23, 1932, Serial No. 607,098. Divided and this application August 11, 1934, Serial No. 739,398

3 Claims. (Cl. 217—68)

My invention relates to a splice for the ends of binding wire used to bind packages and particularly to a splice for uniting the ends of binding wires stapled to boxes and crates, and comprises both the wire-bound box so produced and the method of its production. The present application, however, is limited to the product.

The principal feature of this invention is to form a splice by intertwisting the ends of binding wire on a wire-bound box in such manner as to provide an improved and stronger splice than is provided by any of the common forms of spliced joints now made. Said improved splice is made according to the method described in my Patent No. 1,955,409, granted April 17, 1934, and also described and claimed in my application, Serial No. 607,098, filed April 23, 1932 and allowed April 18, 1934, and matured into Patent 1,980,474, of which this present application is a division.

According to the prior practice of joining the wire ends together, the said ends were first bent outward perpendicularly to the surface of the box wall, and gripped at a predetermined distance from the box wall between the two jaws of a twisting tool, which jaws are revolved circumferentially around the wire ends to thus twist the said wires together. During the twisting operation, one pair of convolutions were formed for each revolution of the twisting jaws, until the maximum number permissible or possible within the space between the box wall and said twisting jaws, was made. The twisting was thus continued to an extent which tightly jammed the convolutions together, and when the strain upon said convolutions then or thereafter became excessive the wire, usually at those portions of its ends in direct contact with the jaws, was severed, thus completing the twisting operation. Since the finished twist was then projecting outward from the box, it next had to be turned downward parallel to the box wall.

In the form of twist just described, there are certain defective features. One is the excessive strain at the sharp corners of the wire ends which are formed when the said wire ends are bent perpendicular to the box wall, which strain is caused by the concentrated and prolonged twisting action upon these points. Another is the natural tendency for the wires to untwist, when a strain is exerted at their juncture which tends to progressively spread them apart. Another undesirable feature is the dangerous condition caused when the twisted ends are accidentally swung outward from their proper position parallel to the box, in which projected position the torn and jagged ends may cause injury to, or tear the clothing of, a person handling the box.

As contradistinguished from such former procedure, in the form of twist made according to this invention there are no concentrated strains exerted at any particular part of the binding wire ends and there will be no tendency for the wires to become untwisted, since any pulling strain will be equally divided between each convolution throughout the twisted section. Furthermore, there will be no possibility of the twisted portions being moved since they normally lie flat against the box wall after the twist is completed and are under tension in that position, this being due to the fact that, before making the splice, the wire ends will both lie in their normal positions, parallel with a side wall of the box, and with their ends tucked under retaining members.

By comparison, while the strength of the twist now commonly used is approximately fifty per cent of the tensile strength of the wire, the strength of the twist formed according to this invention is even stronger than the individual strands of untwisted binding wire. Under test it has been found that the wire will break before the twisted splice can be pulled apart. A splice of the character and embodying my present invention can most conveniently be made by using the twisting tool described and claimed in my before mentioned Patent No. 1,955,409.

In the accompanying specification and drawing, I have described and illustrated a preferred embodiment of this invention in a wirebound box and also one modification thereof.

In the drawing:

Fig. 1 is a fragmentary perspective view of one end of a wirebound box having the ends of a binding wire spliced together along one end of said box.

Fig. 2 is an enlarged fragmentary perspective of one corner of a box showing the approximate positions of the ends of the binding wire previous to starting the twisting operation, and also portions of the preferred twisting tool of my before mentioned patent in operative position.

Fig. 3 is a view similar to Fig. 2 showing a completed splice after the said tool has been removed, and Fig. 4 is a view similar to Fig. 3 showing a modified form of splice.

Referring to Fig. 1, a binding wire 10 is shown stretched around a box 12 and secured thereto at spaced apart positions by means of staples 14, 14. One free end 16 (see Fig. 2) of said wire 10 extends beyond one end of the cover portion 18, around the corner and down along the end wall, while the other free end 20 extends along said end wall and above the top surface of the box, said wire end portions lying side by said ready to be spliced together in a manner which will now be described.

By means of a twisting tool of the type described in my said Patent No. 1,955,409, the parallel adjacent portions of the wires are adapted to be intertwisted. The essential parts of said twisting tool are shown in Fig. 2 of this patent and comprise a rotatable pinion 24 having a slot 26, within which the wire ends 16 and 20 are slipped. Said pinion 24 is then rotated by means of a gear such as indicated in part at 28, and which is given a partial rotation to revolve the pinion 24 a predetermined number of times. If the twisting pinion is brought into engagement with the wire ends midway between the ends of same as in Fig. 2, and then rotated, the wire portions above and below said pinion will be twisted in opposite directions to form the splice shown in Fig. 3. As soon as the pinion starts rotating, the upwardly disposed wire end 20 will become jammed behind that portion of binding wire 10 which passes over the corner of the cover 18, as indicated at 30, while the lower end 16 will jam behind a staple 14a.

Two pairs of helical convolutions, one above and one below the pinion 24, are formed each time the said pinion is rotated, and each one as formed crowds the next one away until the series stretches out in uniform alignment in such manner as to provide a tight and long splice which cannot be pulled apart before the wire breaks, regardless of the amount of strain applied thereto. This is because there is no concentration of twisting action on any particular part of the wire, while the convolutions are being formed, due to the particular binding wire section passing beneath the staple 14 on the box cover, rotating freely thereunder; while the wire section extending up along the box end 27 will be permitted to similarly rotate under staples 14 and 14a on said box end, thereby causing no concentrated strain on said binding wire or on any particular portion thereof. The upwardly projecting end 20 of the wire is confined under the bend 30 of the other wire end 16 where the latter rounds the box corner, while the said other wire end 16 of the wire is confined by the staple 14a. Consequently all twisting action between these points results in the formation of intertwined helices of wire, with convolutions closely jammed together, as shown in Fig. 3, thus producing a structural and frictional engagement that produces a perfect splice. Beyond these points the single strands of wire twist harmlessly, if at all, or the whole loop of wire may rotate if it is loosely held in the remaining staples. The wire ends 16 and 20 will be of sufficient length before twisting to provide only short ends beyond the twisted convolutions, so that there will be no need for cutting same after the splice is completed.

When the desired number of convolutions are formed the twisting tool is withdrawn, thus removing the pinion from engagement with the flattened or untwisted portion 32, of the completed splice. After the twisting tool is removed, the splice does not require any additional manipulation because it has no projecting portions or ends, but lies flat against the adjacent wall of the box. Furthermore, there are no parts to become dislodged or moved which might become dangerous, such as is possible with the old twist which was formed perpendicularly to the box surface.

In Fig. 4, a modified form of twist is shown which is made by engaging the wire ends 16a and 20a, at the lowermost portion of the end 16a, by the twisting pinion 24. When said pinion is rotated in this position, the convolutions are all formed in one direction, and since the lowermost end 16a is engaged by the pinion, it is only necessary to provide one abutment for the uppermost end 20a. Said end 20a is jammed behind that portion 30a of the binding wire which passes over the corner of the box cover 18 similarly to the way described when explaining the construction shown in Fig. 3. In this case only one pair of double, intertwined helices of wire are formed, but the structural and frictional resistances to separation are again sufficient. The wirebound box so produced according to my invention is also a more securely fastened package than any having a similar wire splice formed by the tools of the prior art hereinbefore referred to would be. Any wirebound package made with such prior art tools which grasp the wires at three points would be more insecurely bound because an untwisting action might tend to occur at the ends which would be left free in such possible prior art procedure, but in the case of my present invention any such untwisting of the splice is checked by the anchoring effect of the staple or staples against which the free end or ends of the wire rests or rest, or by the similar action of the wire bend around a box corner, as shown in Figs. 3 and 4.

While the two forms of twist shown are preferred forms, other forms might be made, such modifications being within the principles and general scope of the invention here claimed, if the method of construction explained above is substantially employed, and the results described are still obtained. Obviously also, this type of splice could be produced by forms of tool apparatus other than that described in the above noted Patent No. 1,955,409 and fragmentarily illustrated here. Also, the holding means for the wire end portions could be varied. Thus, if the wire end 16a were extended around the lower corner of the box, the staple 14 shown in the end wall could be dispensed with and a double twist produced like that shown in Fig. 3. Conversely, if the wire end 20 were not extended to the upper box corner, a second staple 14a might serve as the holding means against mutual rotation of the wire strands at the upper end of the splice.

I am aware that heretofore numerous wire twisting tools have been disclosed by which the adjacent, parallel ends of the wire loop to be twisted together but my present invention has developed for the first time a twisted joint for box-binding wire ends in which such wire ends are firmly and permanently held in place by anchorages permanently associated with the box itself, so that there can be no subsequent partial untwisting of the twisted sections and no displacement thereof, after the twisting operation has been completed.

Having described my invention, I claim:

1. A wire-bound box having a loop of binding wire surrounding it arranged with its adjacent end portions extending side by side in opposite directions and twisted together throughout substantial portions of the length of each to form a pair of intertwined helices extending along the adjacent surface of the box to a wire-holding staple to which both said helices are permanently anchored, minor adjacent portions of each wire end being, however, left straight and parallel one to the other; whereby said straight portions were adapted to be jointly grasped by a twisting tool during the formation of said helices.

2. A wire-bound box having a loop of binding wire surrounding it arranged with its adjacent end portions extending side by side in opposite directions and twisted together throughout substantial portions of the length of each to form two oppositely coiled pairs of intertwined helices, one pair extending along the adjacent surface of said box to a wire-holding staple to which both helices are permanently anchored at one end, and the other pair extending in the opposite direction to a box corner, minor adjacent portions of each wire end being, however, left straight and parallel one to the other; whereby said straight portions were adapted to be jointly grasped by a twisting tool during the formation of said helices.

3. A wire-bound box having a loop of binding wire surrounding it and arranged with its adjacent end portions extending side by side in opposite directions and twisted together throughout substantial portions of the length of each to form two oppositely coiled pairs of intertwined helices, each such pair of helices extending away from the other and having its outer end engaged by holding means permanently associated with the box, minor adjacent portions of each wire end being, however, left straight and parallel one to the other; whereby said straight portions were adapted to be jointly grasped by a twisting tool during the formation of said helices.

GUS L. COLBIE.